United States Patent
Ionkin et al.

(10) Patent No.: US 8,449,859 B2
(45) Date of Patent: May 28, 2013

(54) SYNTHESES OF QUATERNARY CHALCOGENIDES IN CESIUM, RUBIDIUM, BARIUM AND LANTHANUM CONTAINING FLUXES

(75) Inventors: Alex Sergey Ionkin, Kennett Square, PA (US); Brian M. Fish, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/502,430

(22) PCT Filed: Nov. 22, 2010

(86) PCT No.: PCT/US2010/057563
§ 371 (c)(1),
(2), (4) Date: Apr. 17, 2012

(87) PCT Pub. No.: WO2011/066204
PCT Pub. Date: Jun. 3, 2011

(65) Prior Publication Data
US 2012/0201741 A1    Aug. 9, 2012

Related U.S. Application Data

(60) Provisional application No. 61/264,476, filed on Nov. 25, 2009.

(51) Int. Cl.
*C01B 17/00* (2006.01)
*C01B 19/00* (2006.01)

(52) U.S. Cl.
USPC ............................................. 423/508; 423/511

(58) Field of Classification Search
USPC ..................................................... 423/508, 511
See application file for complete search history.

(56) References Cited

U.S. PATENT DOCUMENTS

2012/0219491 A1*  8/2012  Ionkin ............................ 423/511
2012/0219492 A1*  8/2012  Ionkin ............................ 423/511

FOREIGN PATENT DOCUMENTS

DE    202008009492 U1    12/2009

OTHER PUBLICATIONS

Altosaar, M. et al., Cu2Zn1-xCdxSn(Se1-ySy)4 solid solutions as absorber materials for solar cells, Physica Status Solidi A: Applications and Materials Science, 2008, pp. 167-170, vol. 205, No. 1.
Altosaar, M. et al., CU2ZnSnSe4 Monograin Powders for Solar Cell Application, Photovoltaic Energy Conversion, Conference Record of 2006 IEEE 4th World Conference, IEEE, 2006, pp. 468-470.
Schorr, Susan et al., In-situ investigation of the kesterite formation from binary and ternary sulphides, Thin Solid Films, 2009, pp. 2461-2464, vol. 517, No. 7.
Mitchell, Kwasi et al., Rare-Earth Transition-Metal Chalcogenides, Chemical Reviews, 2001, pp. 1929-1952, vol. 102.

* cited by examiner

*Primary Examiner* — Timothy Vanoy

(57) ABSTRACT

The present invention relates to syntheses of quaternary chalcogenide compounds such as copper zinc tin sulfide in cesium, rubidium, barium and lanthanum containing fluxes. The quaternary chalcogenides are useful as the absorber layer as a p-type semiconductor in a thin film solar cell application.

14 Claims, 2 Drawing Sheets

SYNTHESES OF QUATERNARY CHALCOGENIDES IN CESIUM, RUBIDIUM, BARIUM AND LANTHANUM CONTAINING FLUXES

CROSS REFERENCE TO RELATED APPLICATIONS

This application claims priority under 35 U.S.C. §119(e) from, and claims the benefit of, the following U.S. Provisional Application No. 61/264,476; filed on Nov. 25, 2009, and which is by this reference incorporated in its entirety as a part hereof for all purposes.

FIELD OF THE INVENTION

The present invention relates to syntheses of quaternary chalcogenide compounds, such as copper zinc tin sulfide in cesium, rubidium, barium and lanthanum containing fluxes. The quaternary chalcogenides are useful as the absorber layers as a p-type semiconductor in a thin film solar cell application.

BACKGROUND

Solar cells, also termed photovoltaic or PV cells and solar modules convert sunlight into electricity. These electronic devices have been traditionally fabricated using silicon (Si) as a light-absorbing, semiconducting material in a relatively expensive production process. To make solar cells more economically viable, solar cell device architectures have been developed that can inexpensively make use of thin-film, light-absorbing semiconductor materials such as copper-indium-gallium-sulfo-di-selenide, $Cu(In,Ga)(S,Se)_2$, also termed CIGS. This class of solar cells typically has a p-type absorber layer sandwiched between a back electrode layer and an n-type junction partner layer. The back electrode layer is often Mo, while the junction partner is often CdS. A transparent conductive oxide (TCO) such as zinc oxide doped with aluminum is formed on the junction partner layer and is typically used as a transparent electrode.

Despite the demonstrated potential of CIGS in thin-film solar cells, the toxicity and low abundance of indium and selenium are major impediments to the widespread use and acceptance of CIGS in commercial devices. An attractive alternative for absorber layers of thin film solar cells are quaternary chalcogenides, particularly copper zinc tin sulfide, $Cu_2ZnSnS_4$ (CZTS). CZTS has a direct bandgap of about 1.5 eV and an absorption coefficient greater than 104 $cm^{-1}$. In addition, CZTS does not include any toxic or non-abundant elements.

Thin films of CZTS have been prepared via sputtering of Cu, SnS, and ZnS precursors, hybrid sputtering, pulsed laser deposition, spray pyrolysis of halides and thiourea complexes, electrodeposition/thermal sulfurization, E-beam Cu/Zn/Sn/thermal sulfurization, and sol-gel deposition, followed by thermal sulfurization.

Bulk quantities of CZTS have been prepared in evacuated quartz ampoules at temperatures between 400° C. to 1150° C. Bulk quantities have also been prepared in a furnace with a source of sulfur, such as $H_2S$.

There is a need for a safe, robust process to produce CZTS and it chalcogenide analogs in bulk quantities for non-vacuum based thin-film photovoltaics.

DETAILED DESCRIPTION

Figure 1:
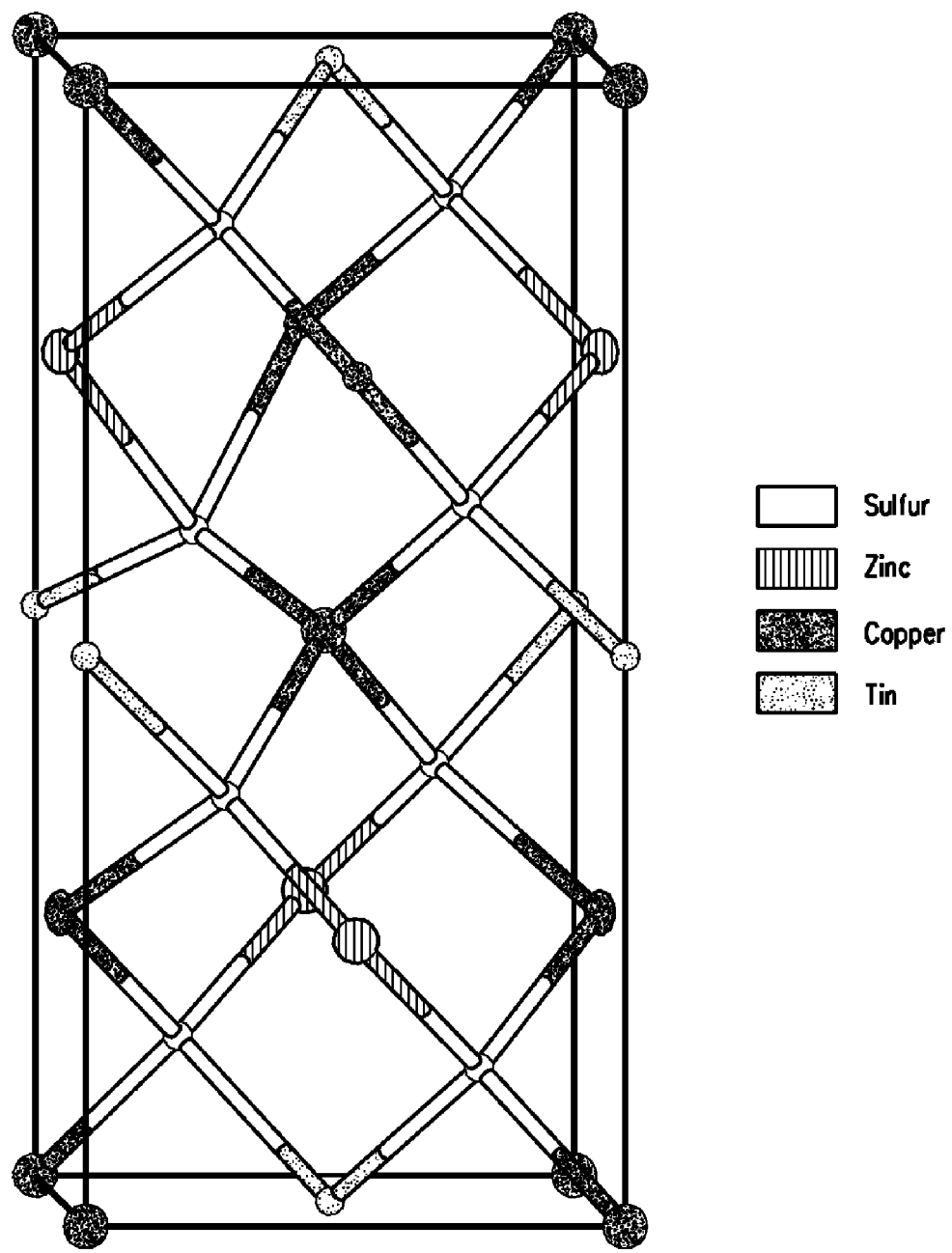
FIG. 1 is a single X-ray analysis of the structure of a cell of kesterite.

Described herein is a process, comprising:
a) providing a reaction mixture comprising:
   i) a source of a first element selected from Cu, Ag, Au, Cu salt, Ag salt, Au salt or mixture thereof;
   ii) a source of a second element selected from Zn, Cd, and Hg, Zn salt, Cd salt, Hg salt, or mixture thereof;
   iii) a source of a third element selected from Ge, Sn, and Si, Ge salt, Sn salt, Si salt or mixture thereof;
   iv) a source of chalcogen; and
   v) a flux;
   wherein the total molar ratio of the (first element):(second element):(third element):(chalcogen) in the reaction mixture is about 2:1:1:(4 or greater);
b) heating the reaction mixture in an inert atmosphere to a temperature of about 150° C. to about 1000° C.; and
c) cooling the reaction mixture.

The source of the first element can be selected from metallic Cu, metallic Ag, metallic Au, a Cu salt, a Ag salt, a Au salt, or mixtures thereof. The source of the second element can be selected from metallic Zn, metallic Cd, metallic Hg, a Zn salt, a Cd salt, a Hg salt, or mixtures thereof. The source of the third element can be selected from metallic Ge, metallic Sn, a Ge salt, a Sn salt, a Si salt, or mixtures thereof. The salt can contain any additional anion or cation that does not adversely affect the process or the final product.

The source of the first, second or third element can be the same; that is, the source of the first element is also the source of the second element or the source of the third element, or the source of the second element is also the source of the third element. For example, copper tin sulfide can serve as a source of first and third elements.

Metal sulfides and selenides are convenient sources of the first, second and third elements. Examples include copper(II) sulfide, copper(I) sulfide, zinc(II) sulfide, tin(II) sulfide, germanium(II) sulfide, cadmium(II) sulfide, copper(II) selenide, zinc(II) selenide, tin(II) selenide, tin (IV) sulfide, and copper tin sulfide.

As used herein, the term "chalcogen" refers to sulfur (S), selenium (Se), and tellurium (Te). Suitable sources of chalcogen include elemental sulfur (S); elemental selenium (Se); elemental tellurium (Te); cation salts of sulfide anions ($S^{-2}$), hydrogen sulfide anions ($HS^-$), or polysulfide anions; cation salts of selenide or hydrogen selenide anions; cation salts of telluride or hydrogen telluride anions; metal sulfides; metal selenides; metal tellurides; and mixtures thereof. Suitable cations include ammonium, tetraalkylammonium, tetraarylammonium, and alkali and alkaline earth metals. Suitable metal sulfides, selenides, and tellurides include Cu, Ag, Au, Zn, Cd, Hg, Ge, and Sn sulfides, Cu, Ag, Au, Zn, Cd, Hg, Ge, and Sn selenides, and Cu, Ag, Au, Zn, Cd, Hg, Ge, and Sn tellurides, and mixtures thereof. The source of chalcogen can be the same as the source of the first element (for example, CuS), the source of the second element (for example, ZnS), or the source of the third element (for example, SnS).

In one embodiment the chalcogen is sulfur and the source of chalcogen is elemental sulfur. In another embodiment the source of chalcogen is one or more metal sulfides, wherein the metal sulfides also serve as the source of the first element, the source of the second element, and/or the source of the third element.

The total molar ratio of the (first element):(second element):(third element):(chalcogen) in the reaction mixture is about 2:1:1:(4 or greater). The ratios of the first element, second element, and third element can deviate from these integer values by 20 mole %. This can occur when some of the elements are replaced by a different element, but only to the extent that the composition remains neutral. For example, in one embodiment, the Zn content can be enriched by decreasing the Cu content, producing Cu:Zn:Sn:S in a ratio of 1.8: 1.2:1:4.

The molar ratio of chalcogen to the second element is at least 4, but can be as high as 20. Typically, the molar ratio of chalcogen to the second element is 6-10, or about 8.

The flux is a salt that is molten at reaction temperatures and does not adversely affect the reactants or the final product. The flux comprises one or more cations selected from cesium, rubidium, barium and lanthanum. The flux can optionally comprise one or more cations selected from lithium, sodium, potassium, copper, silver, gold, beryllium, magnesium, calcium, strontium, zinc, cadmium, mercury, boron, aluminum, gallium, indium, thallium, scandium, and yttrium. The flux also comprises one or more anions selected from fluoride, chloride, bromide, iodide, oxide, hydroxide, sulfide, selenide, telluride, carbonate, silicate, sulfate, phosphate, pyrophosphate, sulfate, sulfonic, and phosphonic. In one embodiment, the flux comprises chloride, bromide, or iodide. In another embodiment, the flux comprises $BaCl_2$, $CdCl_2$, $CsAlCl_4$, CsBr, CsCl, CsF, CsI, KCl, $LaCl_3$, LiCl, $MgCl_2$, RbBr, RbCl, RbI, $ZnCl_2$, or a mixture thereof.

The reaction mixture can be prepared by combining the individual components either before or after being placed in the reaction vessel. The individual components can be pre-milled separately or after combining. The combining can be done by any means as long as the individual components are homogenized, for example by, grinding, shaking, and/or ball milling. Typically, the particle sizes of individual components of the reaction mixture are between 350 mesh size and 5 mesh size, or between 200 and 325 mesh. After combining, the reaction mixture can be in powder form or formed into any shape, such as a pressed pellet.

The process described herein can prepare a composition of the formula $(E1)_2(E2)_1(E3)_1(chalcogen)_4$, where E1 is the first element and is one or more of Cu, Ag, and Au; E2 is the second element and is one or more of Zn, Cd, or Hg; E3 is the third element and is one or more of Ge, Sn, or Si; and chalcogen is as defined above. The stoichiometry of the elements may vary from strictly 2:1:1:4 and may also be doped by small amounts of other elements such as alkali and alkali earth metals.

In one embodiment, the first element is Cu, the second element is Zn or Cd, and third element is Ge or Sn, and the chalcogen is S. In other embodiments, the process can be used to prepare compositions of the formula $Cu_2ZnSnSe_4$, $Cu_2ZnGeS_4$, $Cu_2ZnSnS_3Se_1$, $Cu_2CdSnS_4$, or $Cu_2ZnSnS_4$.

The reaction mixture is heated in an inert atmosphere. By "inert atmosphere" it is meant an atmosphere that is inert to the precursor mixture, such as helium, neon, argon, krypton, xenon, nitrogen and mixtures thereof. In particular, the inert atmosphere should not contain water, oxygen, or $H_2S$. The inert atmosphere may be streamed or flowed over an open container during the heating step.

The total time of heating is not critical and depends on the temperature and the desired conversion, but must be at least long enough for the flux to substantially melt. Suitable heating times include 0.25 hr, 1 hour, 2 hours, 6 hours, 12 hours, 24 hours, 2 days, 3 days and 5 days, and any time interval inbetween.

The reaction mixture is heated to a temperature at which the flux will melt, typically about 300° C. to about 1000° C., about 400° C. to about 800° C., or about 500° C. to about 750° C. The heating can be performed in any manner, such as in one step, ramping or stepping to the upper temperature, or cycling between the lower and the upper temperature. The heating can be performed using any means, such as in a tube furnace. The precursor mixture can be heated starting at ambient temperature or placed directly at the lower or upper temperature.

The process includes a step of cooling the reaction mixture, typically to ambient temperature and typically in the flow of an inert gas, e.g., nitrogen, argon, helium or a mixture of thereof.

In one embodiment, the reaction mixture is heated in an open container. By "open container" is meant a container which is open to the inert atmosphere, that is, contains at least one opening which allows a free vapor communication between the precursor mixture and ambient pressure, thus maintaining the precursor mixture essentially in equilibrium with the ambient pressure. The open container can be made out of any material that is inert to the precursor mixture, such as alumina, aluminum nitride, magnesia, magnesia with alumina, zirconia, zirconia with yttrium oxide, carbon graphite, platinum, and alloys of platinum, gold and rhodium. The open container can be of any shape or size such as combustion boats, crucibles, incineration trays, incineration dishes, and the bottom floor of an oven or furnace.

In another embodiment, the process includes a step where the flux is removed from the reaction mixture after step b) or step c) by washing with a flux solvent. The washing can be done by dissolving a flux in a suitable flux solvent, that is, one in which the flux will dissolve but the desired product is inert and remains substantially undissolved. The flux solvent can be a single solvent or a mixture of two or more solvents. Suitable flux solvents include water, dimethylsulfoxide, tetrahydrofuran, trimethylphosphate, triethylphosphate, dimethylcarbonate, aqueous ammonia, ammonium hydroxide, diethylcarbonate, alcohols such as methanol, ethanol, or isopropanol, amides such as dimethylformamide, ketones such as acetone, or ethylmethylketone, esters such as ethyl acetate or butyl acetate, ethers such as ethyl ether or dibutyl ether, and mixtures thereof.

The desired product can be separated from the flux solvent by any means known in the art, such as vacuum filtration or centrifugation. The product can be further dried, such as in vacuum for 24 hours at room temperature or at elevated temperature up to 200° C.

The CZTS prepared by the method described above can be useful in the fabrication of electronic devices such as photovoltaics.

EXAMPLES

Copper(II) sulfide, copper(I) sulfide, zinc(II) sulfide, tin (II) sulfide, germanium(II) sulfide, cadmium (II) sulfide, copper(II) selenide, zinc(II) selenide, tin(II) selenide were purchased from Alfa Aesar. Elemental sulfur was purchased from Aldrich. Tin (IV) sulfide was purchased from Pfaltz & Bauer Inc. Copper tin sulfide was prepared according to the literature procedure described in Fiechter, S.; et al., Journal of Physics and Chemistry of Solids (2003), 64(9-10), 1859-1862. CsF, CsCl, CsBr, CsI, RbCl, RbI, KCl, LiCl, NaCl, $MgCl_2$, $MgI_2$, $ZnCl_2$, $CdCl_2$, $AlCl_3$, $BaCl_2$, $CdCl_2$, $LaCl_3$ were purchased from Alfa Aesar.

X-ray diffraction patterns were compared to standard patterns of CZTS available from International Centre for Diffraction Data (ICDD), located in Newtown Square, Pa.

Example 1

Figure 2:
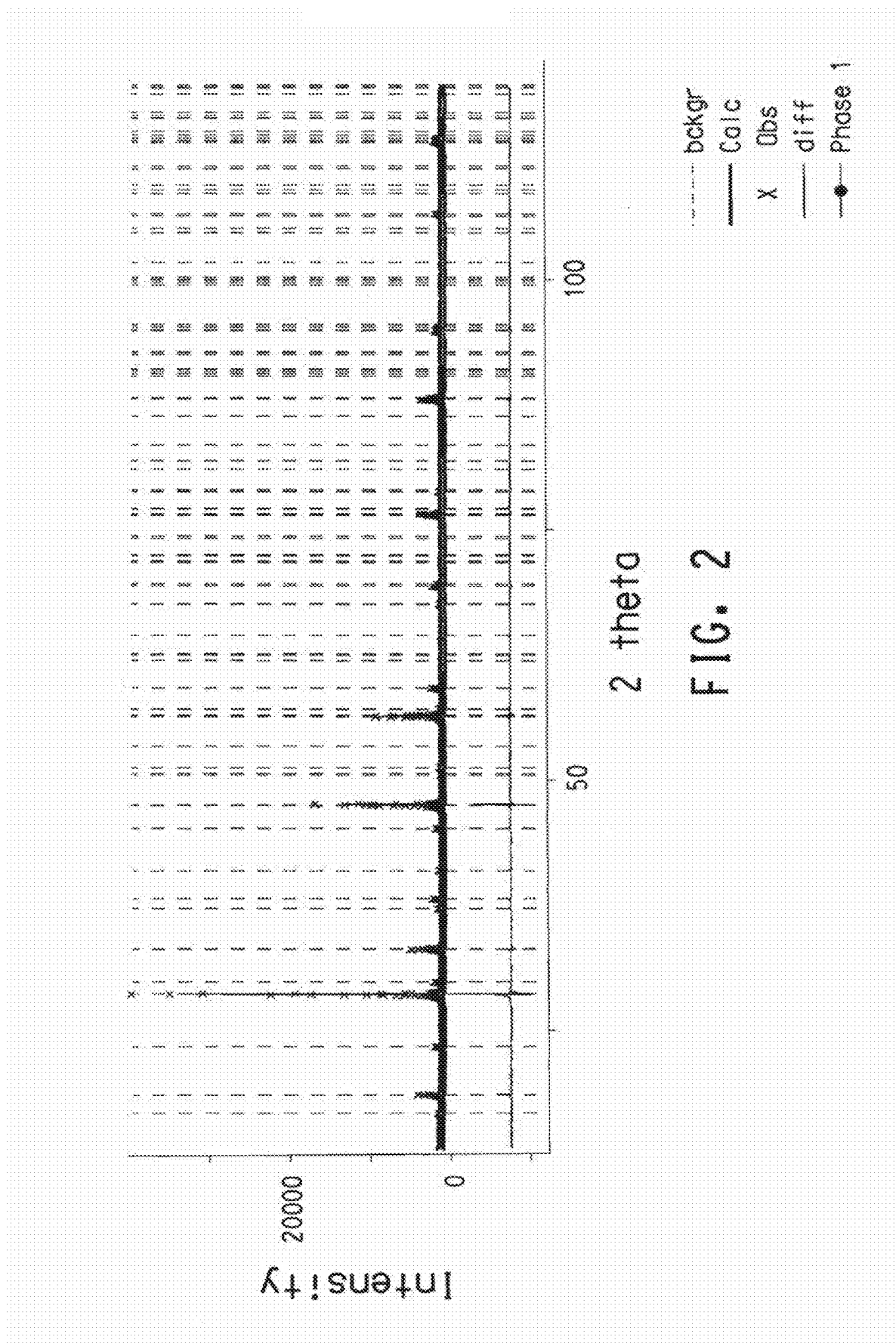
FIG. 2 shows the powder X-ray diffraction spectrum of kesterite.

Synthesis of Copper Zinc Tin Sulfide in CsCl Flux, from Divalent Copper Sulfide and Tetravalent Tin Sulfide Samples of 2.175 g (0.02275 mol) of copper sulfide, 1.11 g (0.0114 mol) of zinc sulfide, 2.08 g (0.0114 mol) of tin(IV) sulfide and 4.5 g of CsCl were mixed together by shaking individual components for 15 minutes in a dry box, placed into a 20 ml alumina boat, and then the boat was put into a tube furnace with nitrogen flow. The boat was heated to 750° C. and kept at this temperature for 24 hours. Then, the furnace was cooled to room temperature. The boat removed and immersed in 500 ml of distilled water. Black crystalline material was filtered off, washed with an additional 500 ml of water and dried at 1 mm vacuum for 12 hours. The CZTS structure was confirmed by single X-ray analysis and powder XRD analyses, shown in FIGS. 1 and 2.

Example 2

Synthesis of Copper Zinc Tin Sulfide in CsCl Flux, from Divalent Copper Sulfide and Tetravalent Tin Sulfide Samples of 4.35 g (0.0455 mol) of copper sulfide, 2.22 g (0.0228 mol) of zinc sulfide, 4.16 g (0.0228 mol) of tin(IV) sulfide and 10.0 g of CsCl were mixed together in a glove box and placed into an alumina boat, and then into a tube furnace with nitrogen flow. The boat was heated to 800° C. and maintained at that temperature for 24 hours. The furnace was cooled to room temperature, and the boat was immersed in 500 ml of distilled water. Black crystalline material was filtered, washed with an additional 500 ml of water, and dried at 1 mm vacuum for 12 hours. The CZTS structure was confirmed by single X-ray analysis and powder XRD analysis.

Example 3

Synthesis of Copper Zinc Tin Sulfide in CsCl Flux, from Divalent Copper Sulfide and Divalent Tin Sulfide Example 2 was repeated using 2.175 g (0.02275 mol) of copper sulfide, 1.11 g (0.0114 mol) of zinc sulfide, 1.72 g (0.0114 mol) of tin(II) sulfide and 10.0 g of CsCl. The CZTS structure of the product was confirmed by single X-ray analysis and powder XRD analysis.

Example 4

Synthesis of Copper Zinc Tin Sulfide in CsBr Flux, from Divalent Copper Sulfide and Tetravalent Tin Sulfide Example 2 was repeated using 2.175 g (0.02275 mol) of copper sulfide, 1.11 g (0.0114 mol) of zinc sulfide, 2.08 g (0.0114 mol) of tin(IV) sulfide and 10.0 g of CsBr. The CZTS structure of the product was confirmed by single X-ray analyses.

Example 5

Synthesis of Copper Zinc Tin Sulfide in CsBr Flux, from Divalent Copper Sulfide and Divalent Tin Sulfide Example 2 was repeated using 2.175 g (0.02275 mol) of copper sulfide, 1.11 g (0.0114 mol) of zinc sulfide, 1.72 g (0.0114 mol) of tin(II) sulfide and 10.0 g of CsBr. The CZTS structure of the product was confirmed by single X-ray analysis and powder XRD analysis.

Example 6

Synthesis of Copper Zinc Tin Sulfide in CsCl/CsF Flux, from Divalent Copper Sulfide and Divalent Tin Sulfide Example 1 was repeated using 4.35 g (0.0455 mol) of copper sulfide, 2.22 g (0.0228 mol) of zinc sulfide, 3.43 g (0.0228 mol) of tin(II) sulfide, 1.0 g of elemental sulfur, 10.0 g of CsCl and 10.0 g of CsF. The CZTS structure of the product was confirmed by single X-ray analysis and powder XRD analysis.

Example 7

Synthesis of Copper Zinc Tin Sulfide in CsCl/CsBr Flux, from Monovalent Copper Sulfide and Tetravalent Tin Sulfide Example 1 was repeated using 7.24 g (0.0455 mol) of copper(I) sulfide, 4.44 g (0.0456 mol) of zinc sulfide, 8.32 g (0.0455 mol) of tin(IV) sulfide, a 1.5 g of elemental sulfur, 20.0 g of CsCl, and 20 g of CsBr. The CZTS structure of the product was confirmed by single X-ray analysis and powder XRD analysis.

Example 8

Synthesis of Copper Zinc Tin Sulfide in CsI Flux, from Divalent Copper Sulfide and Tetravalent Tin Sulfide Example 2 was repeated using 2.175 g (0.02275 mol) of copper sulfide, 1.11 g (0.0114 mol) of zinc sulfide, 2.08 g (0.0114 mol) of tin(IV) sulfide, and 10.0 g of CsI. The CZTS structure of the product was confirmed by single X-ray analysis and powder XRD analysis.

Example 9

Synthesis of Copper Zinc Tin Sulfide in CsCl/LiCl Flux, from Divalent Copper Sulfide and Tetravalent Tin Sulfide Example 1 was repeated using 4.35 g (0.0455 mol) of copper sulfide, 2.22 g (0.0228 mol) of zinc sulfide, 4.16 g (0.0228 mol) of tin(IV) sulfide, 15.98 g CsCl and 4.02 g of LiCl. The CZTS structure of the product was confirmed by single X-ray analysis and powder XRD analysis.

Example 10

Synthesis of Copper Zinc Tin Sulfide in CsCl/NaCl Flux, from Divalent Copper Sulfide and Tetravalent Tin Sulfide Example 1 was repeated using 8.71 g (0.091 mol) of copper sulfide, 4.44 g (0.0456 mol) of zinc sulfide, 8.34 g (0.0456 mol) of tin(IV) sulfide, 35.24 g CsCl and 4.76 g of NaCl. The CZTS structure of the product was confirmed by single X-ray analysis and powder XRD analysis.

Example 11

Synthesis of Copper Zinc Tin Sulfide in CsCl/RbCl Flux, from Divalent Copper Sulfide and Divalent Tin Sulfide

Example 1 was repeated using 4.35 g (0.0455 mol) of copper sulfide, sample of 2.22 g (0.0228 mol) of zinc sulfide, 3.43 g (0.0228 mol) of tin(II) sulfide, 10.00 g CsCl and 10.00 g of RbCl, and heating at 700° C. The CZTS structure of the product was confirmed by single X-ray analysis and powder XRD analysis.

Example 12

Synthesis of Copper Zinc Tin Sulfide in CsCl/RbCl Flux, from Divalent Copper Sulfide and Tetravalent Tin Sulfide

Example 11 was repeated using 4.35 g (0.0455 mol) of copper sulfide, sample of 2.22 g (0.0228 mol) of zinc sulfide, 4.16 g (0.0228 mol) of tin(IV) sulfide, 10.00 g CsCl and 10.00 g of RbCl. The CZTS structure of the product was confirmed by single X-ray analysis and powder XRD analysis.

Example 13

Synthesis of Copper Zinc Tin Sulfide in CsCl/KCl/NaCl Flux, from Divalent Copper Sulfide and Tetravalent Tin Sulfide

Example 1 was repeated using 4.35 g (0.0455 mol) of copper sulfide, 2.22 g (0.0228 mol) of zinc sulfide, 4.16 g (0.0228 mol) of tin(IV) sulfide, 13.58 g CsCl, 3.25 g of KCl and 3.17 g of NaCl. The CZTS structure of the product was confirmed by single X-ray analysis and powder XRD analysis.

Example 14

Synthesis of Copper Zinc Tin Sulfide in CsCl/MgCl$_2$ Flux, from Divalent Copper Sulfide and Divalent Tin Sulfide

Example 1 was repeated using 4.35 g (0.0455 mol) of copper sulfide, 2.22 g (0.0228 mol) of zinc sulfide, 3.43 g (0.0228 mol) of tin(II) sulfide, 1.0 g of elemental sulfur, 15.59 g of CsCl and 4.41 g of MgCl$_2$. The CZTS structure of the product was confirmed by single X-ray analysis and powder XRD analysis.

Example 15

Synthesis of Copper Zinc Tin Sulfide in CsCl/ZnCl$_2$ Flux, from Divalent Copper Sulfide and Divalent Tin Sulfide

Example 11 was repeated using 4.35 g (0.0455 mol) of copper sulfide, 2.22 g (0.0228 mol) of zinc sulfide, 3.43 g (0.0228 mol) of tin(II) sulfide, 1.0 g of elemental sulfur, 14.25 g of CsCl and 5.75 g of ZnCl$_2$. The CZTS structure of the product was confirmed by single X-ray analysis and powder XRD analysis.

Example 16

Synthesis of Copper Zinc Tin Sulfide in CsCl/CdCl$_2$ Flux, from Divalent Copper Sulfide and Divalent Tin Sulfide

Example 1 was repeated using 4.35 g (0.0455 mol) of copper sulfide, 2.22 g (0.0228 mol) of zinc sulfide, 3.43 g (0.0228 mol) of tin(II) sulfide, 1.0 g of elemental sulfur, 12.95 g of CsCl and 7.05 g of CdCl$_2$. The CZTS structure of the product was confirmed by single X-ray analysis and powder XRD analysis.

Example 17

Synthesis of Copper Zinc Tin Sulfide in CsCl/BaCl$_2$ Flux, from Divalent Copper Sulfide and Divalent Tin Sulfide

Example 1 was repeated using 8.71 g (0.091 mol) of copper sulfide, 4.44 g (0.0456 mol) of zinc sulfide, 6.88 g (0.0456 mol) of tin(II) sulfide, 1.5 g of elemental sulfur, 24.72 g CsCl and 15.28 g of BaCl$_2$. The CZTS structure of the product was confirmed by single X-ray analysis and powder XRD analysis.

Example 18

Synthesis of Copper Zinc Tin Sulfide in BaCl$_2$/MgCl$_2$ Flux, from Divalent Copper Sulfide and Divalent Tin Sulfide

Example 1 was repeated using 4.35 g (0.0455 mol) of copper sulfide, 2.22 g (0.0228 mol) of zinc sulfide, 3.43 g (0.0228 mol) of tin(II) sulfide, 1.0 g of elemental sulfur, 13.73 g of BaCl$_2$ and 6.28 g MgCl$_2$. The CZTS structure of the product was confirmed by single X-ray analysis and powder XRD analysis.

Example 19

Synthesis of Copper Zinc Tin Sulfide in BaCl$_2$/ZnCl$_2$ Flux, from Divalent Copper Sulfide and Divalent Tin Sulfide

Example 1 was repeated using 4.35 g (0.0455 mol) of copper sulfide, 2.22 g (0.0228 mol) of zinc sulfide, 3.43 g (0.0228 mol) of tin(II) sulfide, 1.0 g of elemental sulfur, 12.09 g of BaCl$_2$ and 7.91 g ZnCl$_2$. The CZTS structure of the product was confirmed by single X-ray analysis and powder XRD analysis.

Example 20

Synthesis of Copper Zinc Tin Sulfide in BaCl$_2$/KCl Flux, from Divalent Copper Sulfide and Divalent Tin Sulfide

Example 1 was repeated using 4.35 g (0.0455 mol) of copper sulfide, 2.22 g (0.0228 mol) of zinc sulfide, 3.43 g (0.0228 mol) of tin(II) sulfide, 1.0 g of elemental sulfur, 11.65 g of BaCl$_2$ and 8.35 g KCl. The CZTS structure of the product was confirmed by single X-ray analysis and powder XRD analysis.

Example 21

Synthesis of Copper Zinc Tin Sulfide in CsCl/AlCl$_3$ Flux, from Divalent Copper Sulfide and Divalent Tin Sulfide Example 1 was repeated using 4.35 g (0.0455 mol) of copper sulfide, 2.22 g (0.0228 mol) of zinc sulfide, 3.43 g (0.0228 mol) of tin(II) sulfide, 1.0 g of elemental sulfur, 11.16 g of CsCl and 8.84 g of AlCl$_3$ and a heating temperature of 500° C. The CZTS structure of the product was confirmed by single X-ray analysis and powder XRD analysis.

Example 22

Synthesis of Copper Zinc Tin Sulfide in CsCl/LaCl$_3$ Flux, from Divalent Copper Sulfide and Divalent Tin Sulfide Example 1 was repeated using 4.35 g (0.0455 mol) of copper sulfide, 2.22 g (0.0228 mol) of zinc sulfide, 3.43 g (0.0228 mol) of tin(II) sulfide, 0.73 g of elemental sulfur, 8.14 g of CsCl and 11.86 g of LaCl$_3$. The CZTS structure of the product was confirmed by single X-ray analysis and powder XRD analysis.

Example 23

Synthesis of Copper Zinc Tin Sulfide in CsBr/RbBr Flux, from Divalent Copper Sulfide and Divalent Tin Sulfide Example 1 was repeated using 4.35 g (0.0455 mol) of copper sulfide, 2.22 g (0.0228 mol) of zinc sulfide, 3.43 g (0.0228 mol) of tin(II) sulfide, 10.00 g of CsCl and 10.00 g of RbCl and a heating temperature of 700° C. The CZTS structure of the product was confirmed by XRD analysis.

Example 24

Synthesis of Copper Zinc Tin Sulfide in RbBr Flux, from Divalent Copper Sulfide and Divalent Tin Sulfide Example 23 was repeated using 2.175 g (0.02275 mol) of copper sulfide, 1.11 g (0.0114 mol) of zinc sulfide, 1.72 g (0.0114 mol) of tin(II) sulfide, 10.00 g of RbBr. The CZTS structure of the product was confirmed by XRD analysis.

Example 25

Synthesis of Copper Zinc Tin Sulfide in RbCl Flux, from Divalent Copper Sulfide and Divalent Tin Sulfide Example 23 was repeated using of 2.175 g (0.02275 mol) of copper sulfide, 1.11 g (0.0114 mol) of zinc sulfide, 1.72 g (0.0114 mol) of tin(II) sulfide, 10.00 g of RbCl. The CZTS structure of the product was confirmed by XRD analysis.

Example 26

Synthesis of Copper Zinc Tin Sulfide in RbI Flux, from Divalent Copper Sulfide and Divalent Tin Sulfide Example 23 was repeated using 2.175 g (0.02275 mol) of copper sulfide, 1.11 g (0.0114 mol) of zinc sulfide, 1.72 g (0.0114 mol) of tin(II) sulfide, 10.00 g of RbI. The CZTS structure of the product was confirmed by XRD analysis.

Example 27

Synthesis of Copper Zinc Tin Tetraselenide in CsCl/CsBr Flux, from Divalent Copper Selenide, Zinc Selenide and Divalent Tin Selenide Example 23 was repeated using 4.55 g (0.032 mol) of copper selenide, 2.30 g (0.016 mol) of zinc selenide, 3.15 g (0.016 mol) of tin(II) selenide, 20.00 g of CsCl and 20.00 g of CsBr. The structure was proved by XRD analysis and a single crystal X-ray analysis. The results of the analysis were:
Cu$_2$Se$_4$SnZn, black, needle, ~0.080×0.010×0.010 mm, tetragonal, I-4, a=b=5.671(4) Å, c=11.302(8) Å, Vol=363.5(4) Å$^3$, Z=2, T=−100.° C., Formula weight=626.98, Density=5.728 g/cm$^3$, μ(Mo)=32.33 mm$^{-1}$ Example 28

Synthesis of Copper Zinc Tin Tetraselenide in CsBr/CsI Flux, from Divalent Copper Selenide, Zinc Selenide and Divalent Tin Selenide Example 23 was repeated using 4.55 g (0.032 mol) of copper selenide, 2.30 g (0.016 mol) of zinc selenide, 3.15 g (0.016 mol) of tin(II) selenide, 20.00 g of CsBr and 20.00 g of CsI. The CZTSe structure of the product was confirmed by XRD analysis.

Example 29

Synthesis of Copper Zinc Tin Tetraselenide in CsCl Flux, from Divalent Copper Selenide, Zinc Selenide and Divalent Tin Selenide Example 2 was repeated using 4.55 g (0.032 mol) of copper selenide, 2.30 g (0.016 mol) of zinc selenide, 3.15 g (0.016 mol) of tin(II) selenide, 20.00 g of CsCl. The CZTSe structure of the product was confirmed by XRD analysis.

Example 30

Synthesis of Copper Zinc Tin Trisulfide Monoselenide in CsCl/CsBr Flux, from Divalent Copper Sulfide, Zinc Selenide and Tetravalent Tin Sulfide Example 23 was repeated using 4.02 g (0.042 mol) of copper sulfide, 3.03 g (0.021 mol) of zinc selenide, 3.84 g (0.021 mol) of tin(IV) sulfide, 10.00 g of CsCl and 10.00 g of CsBr. The structure was proved by XRD analysis and XRD analysis. The results of the analysis were:
Cu$_2$S$_3$Se$_{0.50}$SnZn, black, dodecahedron, ~0.110×0.110× 0.110 mm, tetragonal, I-4, a=b=5.4795(15) Å, c=10.913(3)

Å, Vol=327.67(16) Å³, Z=2, T=−100.° C., Formula weight=446.80, Density=4.529 g/cm³, μ(Mo)=17.38 mm⁻¹

Example 31

Synthesis of Copper Zinc Tin Trisulfide Monoselenide in CsCl/KCl/NaCl Flux, from Divalent Copper Sulfide, Zinc Selenide and Tetravalent Tin Sulfide Example 1 was repeated using 4.02 g (0.042 mol) of copper sulfide, 3.03 g (0.021 mol) of zinc selenide, 3.84 g (0.021 mol) of tin(IV) sulfide, 13.58 g CsCl, 3.25 g of KCl, and 3.17 of NaCl. The CZTS/Se structure of the product was confirmed by XRD analysis.

Example 32

Synthesis of Copper Zinc Tin Trisulfide Monoselenide in CsCl/KCl/NaCl Flux, from Divalent Copper Sulfide, Zinc Selenide and Tetravalent Tin Sulfide Example 1 was repeated using 8.04 g (0.084 mol) of copper sulfide, 6.06 g (0.042 mol) of zinc selenide, a sample of 7.68 g (0.042 mol) of tin(IV) sulfide, 1.34 g of elemental sulfur, 27.16 g CsCl, 6.50 g of KCl, and 6.34 of NaCl and a temperature of 600° C. The CZTS/Se structure of the product was confirmed by XRD analysis.

Example 33

Synthesis of Copper Zinc Tin Trisulfide Monoselenide in CsCl/CsBr Flux, from Divalent Copper Selenide, Znc Sulfide and Tetravalent Tin Sulfide Example 1 was repeated using 5.86 g (0.042 mol) of copper selenide, 2.01 g (0.021 mol) of zinc sulfide, 3.76 g (0.021 mol) of tin(IV) sulfide, 10.00 g of CsCl and 10.00 g of CsBr. The CZTS/Se structure of the product was confirmed by XRD analysis.

Example 34

Synthesis of Copper Zinc Tin Trisulfide Monoselenide in CsCl Flux, from Divalent Copper Sulfide, Zinc Sulfide and Divalent Tin Selenide Example 1 was repeated using 3.07 g (0.032 mol) of copper sulfide, 1.56 g (0.016 mol) of zinc sulfide, 3.16 g (0.016 mol) of tin(II) selenide, and 20.00 g of CsCl and a heating temperature of 700° C. The CZTS/Se structure of the product was confirmed by XRD analysis.

Example 35

Synthesis of Copper Cadmium Tin Sulfide in CsCl/BaCl₂ Flux, from Divalent Copper Sulfide, Cadmium Sulfide and Divalent Tin Sulfide Example 1 was repeated using 3.94 g (0.0412 mol) of copper sulfide, sample of 2.96 g (0.0205 mol) of cadmium sulfide, 3.10 g (0.0206 mol) of tin(II) sulfide, 0.7 g of elemental sulfur, 24.72 g CsCl and 15.28 g of BaCl₂. The structure was confirmed by single X-ray analysis and powder XRD analysis. The results of the analysis were:

$CdCu_2S_4SnZn_0$, black, triangular prism, ~0.140×0.050× 0.050 mm, tetragonal, I-4, a=b=5.5888(15) Å, c=10.823(4) Å, Vol=338.04(18) Å³, Z=2, T=−100.° C., Formula weight=486.41, Density=4.779 g/cm³, μ(Mo)=14.07 mm⁻¹

Example 36

Synthesis of Copper Cadmium Tin Sulfide in CsCl Flux, from Divalent Copper Sulfide, Cadmium Sulfide and Divalent Tin Sulfide Example 2 was repeated using 1.97 g (0.0206 mol) of copper sulfide, sample of 1.48 g (0.0103 mol) of cadmium sulfide, 1.55 g (0.0103 mol) of tin(II) sulfide, and 10.0 g CsCl. The structure was confirmed by single X-ray analysis and powder XRD analysis.

Example 37

Synthesis of Copper Cadmium Tin Sulfide in CsBr/RbCl Flux, from Divalent Copper Sulfide, Cadmium Sulfide and Divalent Tin Sulfide Example 1 was repeated using 1.97 g (0.0206 mol) of copper sulfide, sample of 1.48 g (0.0103 mol) of cadmium sulfide, 1.55 g (0.0103 mol) of tin(II) sulfide, 10.0 g CsBr, and 10.0 g of RbCl. The structure was confirmed by single X-ray analysis and powder XRD analysis.

Example 38

Synthesis of Copper Cadmium Tin Sulfide in CsCl/RbCl Flux, from Divalent Copper Sulfide, Cadmium Sulfide and Tetravalent Tin Sulfide Example 1 was repeated using 1.97 g (0.0206 mol) of copper sulfide, sample of 1.48 g (0.0103 mol) of cadmium sulfide, 1.88 g (0.0103 mol) of tin(IV) sulfide, 10.0 g CsCl, and 10.0 g of RbCl. The structure was confirmed by single X-ray analysis and powder XRD analysis.

Example 39

Synthesis of Copper Cadmium Tin Trisulfide Monoselenide in CsCl/CsBr Flux, from Divalent Copper Sulfide, Cadmium Sulfide and Tetravalent Tin Sulfide Example 1 was repeated using 5.86 g (0.042 mol) of copper selenide, sample of 3.03 g (0.021 mol) of cadmium sulfide, 3.76 g (0.021 mol) of tin(IV) sulfide, 10.0 g CsCl, and 10.0 g of CsBr. The structure was confirmed by powder XRD analysis.

Example 40

Synthesis of Copper Zinc Germanium Tetrasulfide in CsCl/CsBr Flux, from Divalent Copper Sulfide, Zinc Sulfide and Divalent Germanium Sulfide Example 1 was repeated using 3.65 g (0.0382 mol) of copper sulfide, 1.86 g (0.0191 mol) of zinc sulfide, 2.00 g (0.0191 mol) of germanium (II) sulfide, 10.0 g CsCl, and 10.0 g of CsBr. The structure was confirmed by a single crystal X-ray and powder XRD analysis. The results of the analysis were:

$Cu_2GeS_4Zn$, black, dodecahedron, ~0.040×0.040×0.040 mm, tetragonal, I-4, a=b=5.340(3) Å, c=10.521(5) Å, Vol=300.0(3) Å$^3$, Z=2, T=−100.° C., Formula weight=393.28, Density=4.354 g/cm$^3$, μ(Mo)=17.15 mm$^{-1}$

Example 41

Synthesis of Copper Zinc Germanium Tetrasulfide in CsCl Flux, from Divalent Copper Sulfide, Zinc Sulfide and Divalent Germanium Sulfide Example 1 was repeated using 3.65 g (0.0382 mol) of copper sulfide, 1.86 g (0.0191 mol) of zinc sulfide, 2.00 g (0.0191 mol) of germanium (II) sulfide, and 20.0 g CsCl and a heating temperature of 700° C. The structure was confirmed by powder XRD analysis.

Example 42

Synthesis of Copper Zinc Germanium Tetrasulfide in CsCl/KCl/NaCl Flux, from Divalent Copper Sulfide, Zinc Sulfide and Divalent Germanium Sulfide Example 1 was repeated using 9.14 g (0.0956 mol) of copper sulfide, 4.45 g (0.0478 mol) of zinc sulfide, 5.00 g (0.0478 mol) of germanium (II) sulfide, 1.53 g of elemental sulfur, 27.16 g CsCl, 6.50 g of KCl, and 6.34 of NaCl and a heating temperature of 600° C. The structure was confirmed by powder XRD analysis.

Example 43

Synthesis of Copper Zinc Tin Sulfide in CsCl flux, from Elemental Copper, Zinc, Tin and Sulfur Samples of 2.89 g (0.0455 mol) of copper, a 1.49 g (0.0228 mol) of zinc, 2.71 g (0.0228 mol) of tin and 20.0 g of CsCl (pre-dried at 750° C.). The CZTS structure of the product was confirmed by single X-ray analysis and powder XRD analysis.

Example 44

Synthesis of Copper Zinc Tin Sulfide in CsCl Flux, from Copper Tin Sulfide and Zinc Sulfide Example 1 was repeated using 8.037 g (0.0235 mol) of copper tin sulfide, 2.29 g (0.0235 mol) of zinc sulfide, and 20.00 g. The CZTS structure of the product was confirmed by single X-ray analysis and powder XRD analysis.

What is claimed is:

1. A process, comprising the steps of:
    a) providing a reaction mixture comprising:
        i) a source of a first element selected from Cu, Ag, Au, Cu salt, Ag salt, Au salt or mixture thereof;
        ii) a source of a second element selected from Zn, Cd, and Hg, Zn salt, Cd salt, Hg salt, or mixture thereof;
        iii) a source of a third element selected from Ge, Sn, and Si, Ge salt, Sn salt, Si salt or mixture thereof;
        iv) a source of chalcogen; and
        v) a flux;
        wherein the total molar ratio of the (first element):(second element):(third element):(chalcogen) in the reaction mixture is about 2:1:1:(4 or greater);
    b) heating the reaction mixture in an inert atmosphere to a temperature of about 150° C. to about 1000° C., wherein the reaction mixture is heated in an open container; and
    c) cooling the reaction mixture.

2. The process of claim 1 wherein the first element is Cu, the second element is Zn or Cd, the third element is Ge or Sn, and the chalcogen is S.

3. The process of claim 1 wherein the source of chalcogen is also the source of the first element, the source of the second element, or the source of the third element.

4. The process of claim 1 wherein the source of the first element is also the source of the second element or the source of the third element, or the source of the second element is the source of the third element.

5. The process of claim 1 that prepares a composition of the formula $(E1)_2(E2)_1(E3)_1(chalcogen)_4$, where E1 is the first element and is one or more of Cu, Ag, and Au; E2 is the second element and is one or more of Zn, Cd, or Hg; and E3 is the third element and is one or more of Ge, Sn, or Si.

6. The process of claim 1 that prepares a composition of the formula $Cu_2ZnSnSe_4$, $Cu_2ZnGeS_4$, $Cu_2ZnSnS_3Se_1$, $Cu_2CdSnS_4$, or $Cu_2ZnSnS_4$.

7. The process of claim 1, wherein the flux is removed from the reaction mixture after step b) or step c) by washing with a flux solvent.

8. The process of claim 1, wherein the flux solvent is water, alcohol, amide, tetrahydrofuran, ketone, ester, ether, dimethylsulfoxide, trimethylphosphate, triethylphosphate, dimethylcarbonate, aqueous ammonia, ammonium hydroxide, diethylcarbonate, methanol, ethanol, iso-propanol, dimethylformamide, acetone, ethylmethylketone, ethyl acetate, butyl acetate, ethyl ether, dibutyl ether, or a mixture thereof.

9. The process of claim 1, wherein the flux is a salt that comprises:
    (a) one or more cations selected from cesium, rubidium, barium and lanthanum, and optionally comprises one or more cations selected from lithium, sodium, potassium, copper, silver, gold, beryllium, magnesium, calcium, strontium, zinc, cadmium, mercury, boron, aluminum, gallium, indium, thallium, scandium, and yttrium; and
    (b) one or more anions selected from fluoride, chloride, bromide, iodide, oxide, hydroxide, sulfide, selenide, telluride, carbonate, silicate, sulfate, phosphate, pyrophosphate, sulfate, sulfonic, and phosphonic anions.

10. The process of claim 1, wherein the flux comprises chloride, bromide, or iodide.

11. The process of claim 1, wherein the flux comprises $BaCl_2$, $CdCl_2$, $CsAlCl_4$, CsBr, CsCl, CsF, CsI, KCl, $LaCl_3$, LiCl, $MgCl_2$, NaCl, RbBr, RbCl, RbI, $ZnCl_2$, or a mixture thereof.

12. The process of claim 1, wherein the reaction mixture is heated to a temperature of about 400° C. to about 800° C.

13. The process of claim 1, further comprising isolating a composition of the formula $(E1)_2(E2)_1(E3)_1(chalcogen)_4$, where E1 is the first element and is one or more of Cu, Ag, and Au; E2 is the second element and is one or more of Zn, Cd, or Hg; and E3 is the third element and is one or more of Ge, Sn, or Si.

14. The process of claim 1, further comprising isolating a composition of the formula $Cu_2ZnSnSe_4$, $Cu_2ZnGeS_4$, $Cu_2ZnSnS_3Se_1$, $Cu_2CdSnS_4$, or $Cu_2ZnSnS_4$.

* * * * *